United States Patent
Miranda d'Orey et al.

(10) Patent No.: US 10,631,228 B2
(45) Date of Patent: Apr. 21, 2020

(54) INFORMATION DISSEMINATION IN A MULTI-TECHNOLOGY COMMUNICATION NETWORK

(71) Applicant: NEC Europe Ltd., Heidelberg (DE)

(72) Inventors: Pedro Miranda d'Orey, Oporto (PT);
Nitin Maslekar, Heidelberg (DE);
Nikola Zahariev, Hannover (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/730,750

(22) Filed: Oct. 12, 2017

(65) Prior Publication Data

US 2018/0054773 A1     Feb. 22, 2018

Related U.S. Application Data

(63) Continuation of application No. 15/329,588, filed as application No. PCT/EP2014/066413 on Jul. 30, 2014, now Pat. No. 9,832,706.

(51) Int. Cl.
*H04W 40/22* (2009.01)
*H04W 4/44* (2018.01)
*H04W 4/46* (2018.01)
*H04W 40/20* (2009.01)
*H04W 84/00* (2009.01)
(Continued)

(52) U.S. Cl.
CPC .......... *H04W 40/22* (2013.01); *H04W 4/44* (2018.02); *H04W 4/46* (2018.02); *H04W 40/04* (2013.01); *H04W 40/12* (2013.01); *H04W 40/20* (2013.01); *H04W 40/34* (2013.01); *H04W 84/005* (2013.01); *H04W 84/18* (2013.01); *H04W 88/04* (2013.01); *H04W 88/06* (2013.01); *H04W 88/16* (2013.01)

(58) Field of Classification Search
CPC ..... H04W 40/04; H04W 40/12; H04W 40/20; H04W 40/22; H04W 40/34; H04W 4/046; H04W 84/005; H04W 84/18; H04W 88/04; H04W 88/06; H04W 88/16
See application file for complete search history.

(56) References Cited

U.S. PATENT DOCUMENTS 6,950,668 B2    9/2005    Brassil et al.
7,085,550 B1 *   8/2006    Echols, Jr. ............ H04W 24/00
                                                          455/403

(Continued)

OTHER PUBLICATIONS

Abderrahim Benslimane et al: "Dynamic Clustering-Based Adaptive Mobile Gateway Management in Integrated Vanet—3G Heterogeneous Wireless Networks", IEEE Journal on Selected Areas in Communications, IEEE Service Center, Piscataway, US, vol. 29, No. 3, Mar. 1, 2011 (Mar. 1, 2011), pp. 559-570, XP011348545.

(Continued)

*Primary Examiner* — Dominic E Rego
(74) *Attorney, Agent, or Firm* — Leydig, Voit & Mayer, Ltd.

(57) ABSTRACT

A method for executing or adapting a forwarding strategy in a vehicular ad-hoc network (VANET) includes performing, by a first vehicle being a node in the VANET, the following actions: analyzing current environmental conditions; creating a forwarding strategy based on the current environmental conditions; and forwarding information to other vehicles in the VANET according to the created forwarding strategy.

20 Claims, 5 Drawing Sheets

(51) Int. Cl.
*H04W 84/18* (2009.01)
*H04W 88/04* (2009.01)
*H04W 88/06* (2009.01)
*H04W 40/04* (2009.01)
*H04W 40/12* (2009.01)
*H04W 40/34* (2009.01)
*H04W 88/16* (2009.01)

(56) References Cited

U.S. PATENT DOCUMENTS

| | | | | |
|---|---|---|---|---|
| 7,657,367 | B1* | 2/2010 | Phuyal | G08G 1/0104 701/117 |
| 9,863,928 | B1* | 1/2018 | Peterson | G01N 33/42 |
| 2004/0073361 | A1* | 4/2004 | Tzamaloukas | G01C 21/3691 701/414 |
| 2005/0097018 | A1* | 5/2005 | Takida | G06Q 20/102 705/35 |
| 2006/0014547 | A1* | 1/2006 | Walter | H04W 4/02 455/456.1 |
| 2006/0031003 | A1* | 2/2006 | Sun | G08G 1/0965 701/117 |
| 2006/0234676 | A1* | 10/2006 | Harris | H04L 63/08 455/410 |
| 2007/0208498 | A1* | 9/2007 | Barker | G08G 1/0104 701/117 |
| 2007/0294023 | A1* | 12/2007 | Arcot | G08G 1/0104 701/117 |
| 2008/0171553 | A1* | 7/2008 | Ren | H04W 72/02 455/450 |
| 2009/0088164 | A1* | 4/2009 | Shen | H04B 7/155 455/436 |
| 2009/0190538 | A1* | 7/2009 | Hasegawa | H04W 76/28 370/329 |
| 2009/0201140 | A1* | 8/2009 | Fargas | B60W 40/101 340/441 |
| 2009/0310571 | A1* | 12/2009 | Matischek | H04W 72/0406 370/336 |
| 2010/0157826 | A1* | 6/2010 | Yu | H04B 7/155 370/252 |
| 2010/0161205 | A1* | 6/2010 | Kim | G08G 1/096716 701/118 |
| 2010/0203905 | A1 | 8/2010 | Chaubey et al. | |
| 2010/0234058 | A1* | 9/2010 | Hu | H04W 52/241 455/522 |
| 2010/0332121 | A1* | 12/2010 | Okude | G01C 21/3415 701/533 |
| 2011/0012756 | A1* | 1/2011 | Yamamoto | H04W 4/04 340/905 |
| 2012/0033123 | A1* | 2/2012 | Inoue | G08G 1/04 348/333.13 |
| 2012/0303215 | A1* | 11/2012 | Kim | B62D 41/00 701/36 |
| 2013/0194108 | A1* | 8/2013 | Lapiotis | G08G 1/096716 340/905 |
| 2013/0214940 | A1* | 8/2013 | Sako | G01C 21/34 340/905 |
| 2014/0003322 | A1 | 1/2014 | Grinshpun et al. | |
| 2014/0071856 | A1* | 3/2014 | Brisebois | H04W 56/00 370/255 |
| 2014/0372498 | A1* | 12/2014 | Mian | H04L 67/12 709/201 |
| 2015/0094940 | A1* | 4/2015 | Stenneth | G08G 1/0125 701/117 |
| 2015/0294563 | A1* | 10/2015 | Korenaga | G08G 1/0116 701/117 |

OTHER PUBLICATIONS

Ming Li et al: "Opportunistic broadcast of event-driven warning messages in vehicular Ad Hoc Networks with lossy links", Computer Networks, Elsevier Science Publishers B.V., Amsterdam, NL, vol. 55, No. 10, Apr. 13, 2011 (Apr. 13, 2011), pp. 2443-242464, XP028378643.

Boangoat Jarupan et al: "A survey of cross-layer design for VANETs", Ad Hoc Networks, Elsevier, Amsterdam, NL, vol. 9, No. 5, Nov. 17, 2010 (Nov. 17, 2010), pp. 966-983, XP028174404.

* cited by examiner

INFORMATION DISSEMINATION IN A MULTI-TECHNOLOGY COMMUNICATION NETWORK

CROSS REFERENCE TO RELATED APPLICATIONS

This application is a continuation of U.S. patent application Ser. No. 15/329,588, filed on Jan. 27, 2017, which is a U.S. National Stage Application under 35 U.S.C. § 371 of International Application No. PCT/EP2014/066413 filed on Jul. 30, 2014. The International Application was published in English on Feb. 4, 2016 as WO 2016/015764 A1 under PCT Article 21(2), all of which applications are hereby incorporated by reference herein.

FIELD

The present invention relates to a method for information dissemination in a multi-technology communication network, for example in a vehicular ad-hoc network (VANET) in which network nodes are equipped with a first communication device for operating via a long range communication network and with a second communication device for performing short-range communication. Furthermore, the present invention relates to a system for multi-technology information dissemination in a communication network, for example in a vehicular ad-hoc network (VANET), in particular a system comprising a number of network nodes being equipped with a first communication device for operating via a long range communication network and with a second communication device for performing short-range communication.

BACKGROUND

Vehicular Ad-hoc Networks (VANET) enable a number of applications, namely safety, transport efficiency or infotainment. These applications rely on the exchange of information between network nodes, i.e. vehicles, and can greatly benefit from information generated far away (e.g. to warn drivers of accidents and road works ahead). Important information can be propagated locally in vehicular networks via multiple hops between vehicles. Additionally, vehicular networks support data exchange using vehicle to infrastructure communications and remote information exchange, optionally with the support of a centralized entity, generally denominated Geoserver. However, the characteristics of vehicular networks, in particular the dynamically changing network topology or network partitioning, create additional challenges for successful data propagation/information dissemination.

Extensive research has been conducted in the broad area of information dissemination, which has the main objective of transferring data in a reliable manner between nodes participating in a communication network. The majority of the existing prior art methods focus on single-technology data dissemination, which can limit the solution optimality. In the context of vehicular network, the most common examples are short-range communications, e.g. ITS (Intelligent Transport Systems)-G5 (which is the European communication standard for vehicular communication), and cellular communications, e.g. Universal Mobile Telecommunications System (UMTS) or Long Term Evolution (LTE).

Both kinds of communications have different advantages and drawbacks. On the one hand, ITS-G5 has low latency but smaller coverage. On the other hand, cellular communications have higher coverage but also higher latency performance. For instance, in T. Mangel et al.: "A comparison of UMTS and LTE for vehicular safety communication at intersections", in IEEE Vehicular Networking Conference, pp. 293-300, 13-15 Dec. 2010, the performance of cellular networks (UMTS, LTE) and ITS-G5 communication is compared as alternative means to exchange safety-critical information at intersections. Here, the authors conclude that cellular networks in isolation are not able to perform as well as ITS-G5 for this specific application type.

Along with the poor coverage/latency ratio, another problem prevalent in vehicular networks is limited message penetration due to insufficient infrastructure availability. Generally, one way to increase the dissemination area would be to deploy ITS-G5 Roadside Units (RSUs) for increasing the connectivity of vehicular ad hoc networks. However, several factors including cost, complexity, and existing systems (e.g. cellular networks), have impeded the deployment of RSUs.

On the other hand, with respect to cellular communication it should be noted that cellular networks show fragmentation due to multiple operators.

Regarding single-technology information dissemination, in many of the current solutions, message penetration is achieved through the infrastructure nodes which are usually placed at pre-defined locations (e.g. intersections, busy road segments). Due to dynamic nature of vehicular networks these static placement lacks the flexibility and may not provide the desired dissemination coverage. Few works in the literature propose using vehicles that act as temporary RSUs (e.g. can make brief stops during which they act as a communication bridge for other vehicles in the network).

For instance, Câmara et al.: "Multicast and Virtual Road Side Units for Multi Technology Alert Messages Dissemination" in IEEE International Conference on Mobile Adhoc and Sensor Systems (MASS), pp. 947-952, 17-22 Oct. 201 present the virtual RSU (vRSU) concept and shows its feasibility. However, the authors only alternatively use different communication technologies and do not consider the case of dissemination information to a geographical area, i.e. involving determining a set of vRSUs. Eckhoff et al.: "Cooperative Awareness At Low Vehicle Densities: How Parked Cars Can Help See Through Buildings" in IEEE Global Telecommunications Conference, pp. 1-6, December 2011 propose the use of parked cars as relay nodes in vehicular networks in especially challenging propagation conditions (e.g. urban intersections). Tonguz et al.: "Cars as Roadside Units: A Self-Organizing Network Solution" in IEEE Communications Magazine, vol. 51, no. 12, pp. 112-120, December 2013 propose a distributed algorithm for selecting vehicles as temporary RSU, which stop for a short time interval for rebroadcasting messages. In general, mobile infrastructure seems to be a very promising solution for improving vehicular communications; however, there is no proper approach which handles multiple requirements which are relevant in vehicular networks.

SUMMARY

In an embodiment, the present invention provides a method for executing or adapting a forwarding strategy in a vehicular ad-hoc network (VANET). The method includes performing, by a first vehicle being a node in the VANET, the following actions: analyzing current environmental conditions; creating a forwarding strategy based on the current environmental conditions; and forwarding information to other vehicles in the VANET according to the created forwarding strategy.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
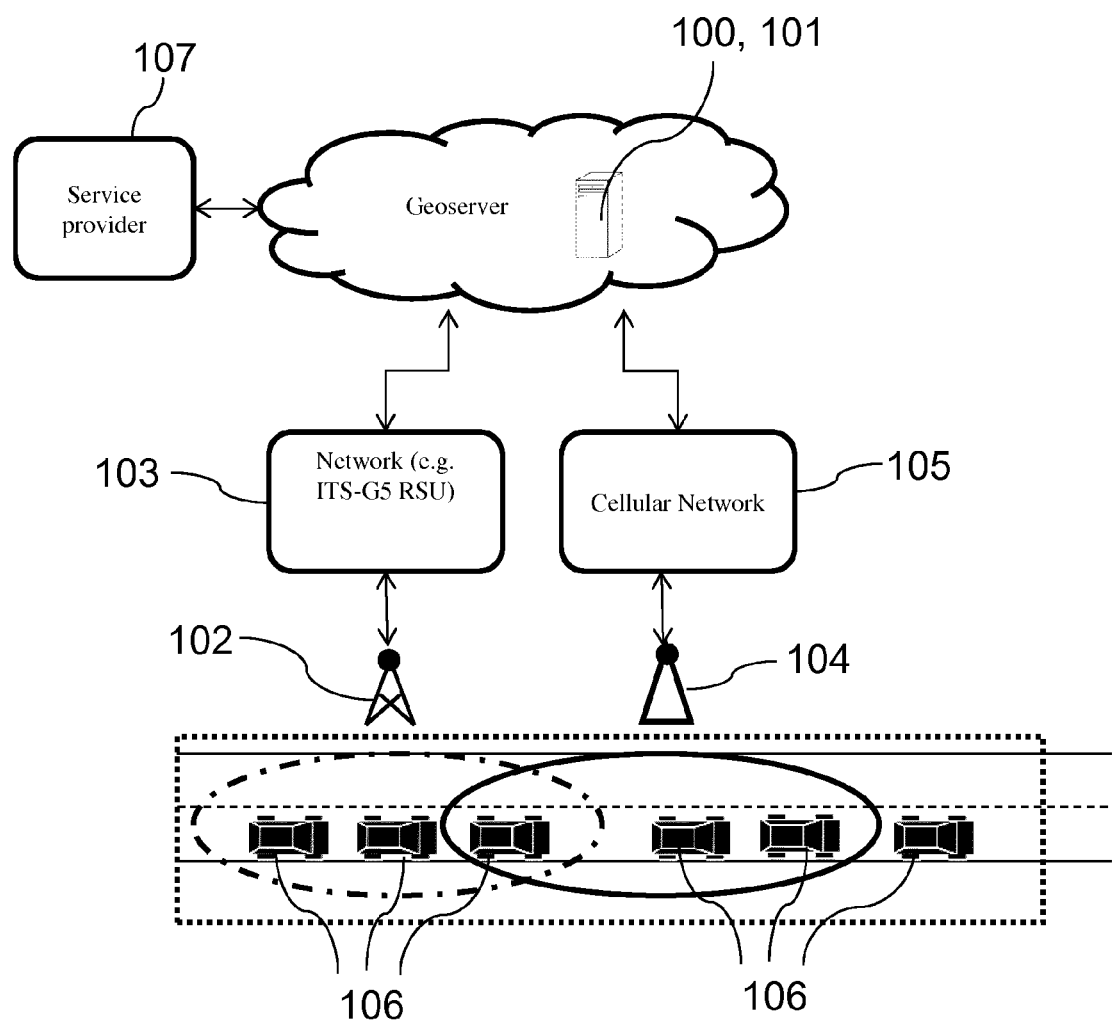
FIG. 1 is a schematic view illustrating a multi-technology information dissemination scenario in accordance with an embodiment of the present invention.

Information dissemination algorithms could consider multiple technologies to combine their advantages and could make use of dynamic infrastructure selection.

A method for information dissemination in a multi-technology communication network and a system for multi-technology information dissemination in a communication network are described herein in which the information dissemination capability is improved and the information penetration within a given destination dissemination area is enhanced.

A method according to an embodiment of the invention is characterized in that the network comprises a central entity performing the steps of determining coverage areas of network nodes, establishing dissimilarity relations between network nodes with respect to said network nodes' coverage areas such that the less similar areas two network nodes cover, the larger is a dissimilarity relation index value between these two network nodes, and subject to configurable constraints, selecting network nodes with the highest dissimilarity relation index value as mobile infrastructure nodes that are intended to act as relay and/or forwarder nodes for supporting optimal information penetration in a given destination dissemination area.

A system according to an embodiment of the invention is characterized in that the system further comprises a central entity being configured to perform the steps of determining coverage areas of network nodes, establishing dissimilarity relations between network nodes with respect to said network nodes' coverage areas such that the less similar areas two network nodes cover, the larger is a dissimilarity relation index value between these two network nodes, and subject to configurable constraints, selecting network nodes with the highest dissimilarity relation index value as mobile infrastructure nodes that are intended to act as relay and/or forwarder nodes for supporting optimal information penetration in a given destination dissemination area.

Efficient and adaptive information dissemination in a multi-technology (long and short range communication) communication network can be achieved through a central entity that selects mobile nodes (relay or forwarders) to act as mobile infrastructure using relevant information, while simultaneously considering multiple constraints. The selected nodes execute the recommended instructions, which can also be enhanced based on local and current conditions.

Vehicle(s) equipped with multi-technology to act as mobile infrastructure (either stationary or moving) with specific constraints can be selected to dynamically adapt the information dissemination capability and maximize the message dissemination area. Minimal computational delay can maximize the election efficiency. The computational complexity arises from the combinatorial nature of the problem as well as from the multi-level selection due to multiple message hops between vehicles.

Embodiments of the present invention can enable more efficient utilization of communication network resources and adaptively react to service request for information dissemination and to dynamically varying conditions. Furthermore, embodiments of the present invention may not require changes of existing communication protocols as the invention can be built on top.

According to a preferred embodiment it may be provided that the central entity determines the coverage areas of the network nodes, e.g. vehicles in case of a VANET, by processing information reported by the network nodes. The information the network nodes report to the central entity may include information regarding their position, their speed, their connectivity, available communication technologies (e.g. ITS-G5 and/or LTE), link quality to neighbor vehicles and road-side units for ITS-G5 networks, cellular latency and packet loss, among others. The reports may be sent on a regular basis. Furthermore, whenever possible or when instructed by the central entity, network nodes may also communicate information of other nodes in close vicinity. Advantageously, it may be provided that only selected network nodes communicate with the central entity in order to decrease the network resources usage. The process of selecting network nodes for communication with the server can follow conventional cluster-based methods (as described, for instance, in L. Yuyi et al.: "Cooperative Data Dissemination in Cellular-VANET Heterogeneous Wireless Networks" in 4th International High Speed Intelligent Communication Forum, pp. 1-4, May 2012) or any other appropriate method. Potentially the relay nodes selected in accordance with the described embodiments of the invention can also be used as aggregators of information to be communicated back to the central server.

According to another preferred embodiment it may be provided that network nodes that are selected as relay nodes further propagate the information through the use of long-range, e.g. cellular, communication and/or short-range communication. In this regard it should be noted that according to embodiments of the invention short-range communication may include communication via wireless local area networks (WLAN) channels, preferably by using ITS-G5 technology. In particular, relay nodes may act as mobile infrastructure, being in charge of vehicle-to-infrastructure communications (e.g. ITS-G5, LTE) and further local information propagation in the vehicle-to-vehicle form (e.g. ITS-G5 vehicle-to-vehicle (V2V) or LTE device-to-device (D2D)). On the other hand, it may be provided that network nodes that are selected as forwarder nodes further propagate the information locally through the use of vehicle-to-vehicle short-range communication.

In a preferred embodiment the central entity is configured to create forwarding decisions and to transmit these forwarding decisions to the selected relay and/or forwarder nodes. Forwarder nodes may receive their instructions to further propagate the information locally either directly from the central entity or from relay nodes. According to a non-adaptive approach it may be provided that the selected relay and/or forwarder nodes, upon receiving forwarding decisions from the central entity, just execute the forwarding decisions. Alternatively, according to an adaptive approach it may be provided that the selected relay and/or forwarder nodes locally adapt forwarding decisions received from the central entity based on local and/or current network conditions, for instance, if the network conditions have evolved.

With respect to the constraints considered by the central entity within the dissemination basis, in particular when selecting network nodes as relay and/or forwarder nodes, it may be provided that these constraints include network specific constraints, constraints related to the network nodes and their communication capabilities, as well as constraints specific to the application from/to which the information to be disseminated originates/belongs to (e.g. a warning information originating from/belonging to a safety application). Specifically, constraints may be specified with respect to the current load and/or congestion situation, the available bandwidth, the network nodes' mobility patterns and/or with respect to the quality of service (QoS) requirements to be fulfilled by the central entity, preferably in terms of latency and/or packet loss. As will be easily appreciated by those skilled in the art, this listing is not exhaustive and other constraints or alternative combinations of constraints not explicitly mentioned above may be specified likewise to be considered by the central entity in the relay and/or forwarder node selection process. According to a preferred embodiment the central entity may be configured to aggregate the specified constraints, such that multiple constraints can be considered simultaneously.

According to a preferred embodiment the central entity comprises at least one interface to a service provider for receiving information dissemination service requests. Also via this interface the service provider may specify constraints related to the request, e.g. with respect to QoS requirements. Apart from the receiving service requests from a service provider, the central entity may be configured to receive service requests from any of the network nodes/vehicles in the communication network, for instance in case a vehicle wishes to propagate a warning message within a certain danger zone.

In order to enable the central entity to efficiently manage the information dissemination process, the central entity may be connected both to infrastructure units that support the vehicle-to-infrastructure short-range communication, in particular ITS-G5 communication, (e.g. mounted along the roads, in particular at intersections) and to infrastructure units that support base stations of the involved long-range network. The functionality provided by the central entity may be distributed hierarchically or in any other form through the use of separate geoserver entities collocated for instance at infrastructure units (e.g. co-located with base stations).

According to a preferred embodiment, in order to enable the central entity to reliably and efficiently establish the similarity relations between network nodes with respect to their coverage areas, the destination dissemination area may be divided into a number of sub-areas. In this regard it may be provided that the division is performed such that the number of reports from network nodes in each sub-area surpasses a predefined statistical relevance level. In case the predefined statistical relevance level is exceeded in a particular sub-area, this sub-area may be further divided into smaller sub-areas. Based thereupon, the determination of the network nodes' coverage areas may be performed independently for the sub-areas. Moreover, the dissimilarity relations between network nodes may be established based on the network nodes' coverage of the sub-areas.

According to another preferred embodiment it may be provided that, subject to the respective constraints that have to be considered, a network node that covers the maximum number of sub-areas in either a single or in multiple iterations is selected as a mobile infrastructure node to act as a first relay node within the information dissemination process. Once this first network node is selected, the network node with the highest dissimilarity index (in relation to this first selected network node) may be selected as the next mobile infrastructure node to act as a relay node.

FIG. 1 schematically depicts a system for multi-technology information dissemination in accordance with an embodiment of the present invention. The embodiment illustrated in FIG. 1 comprises the following building blocks: (1) A central entity 100 (termed Geoserver 101) for processing reports (e.g. vehicle reports) and for calculating the most appropriate selection of base station(s), relay node(s) and forwarder node(s) taking into consideration various constraints/parameters as will be described in detail below; (2) Infrastructure Units, e.g. ITS-G5 RSUs 102 of a corresponding short-range communication network 103 and LTE eNodeB (evolved Node B) 104 of a cellular network 105, which take care of the communication between the central entity 100 and a number of selected vehicles. In FIG. 1, an ITS-G5 RSU coverage area is schematically illustrated by the chain dotted ellipse, while the coverage area of the cellular network 105 is schematically illustrated by the solid line ellipse; (3) Vehicle Intelligent Transportation System (ITS) Stations 106, that are further divided into: (a) relay nodes, which consists of a set of vehicles that act as mobile infrastructure, and that are in charge of vehicle-to-infrastructure communications (e.g. ITS-G5, LTE) and further local information propagation in the vehicle-to-vehicle form (e.g. ITS-G5 vehicle-to-vehicle (V2V) or LTE Device-to-device (D2D); it should also be noted that these nodes send periodic or non-periodic reports to the centralized entity 100, i.e. to the Geoserver 101, that can be also collected from other vehicles); (b) forwarder nodes, which further propagates the information locally through the use of vehicle-to-vehicle communications taking into consideration the plan decided by the Geoserver 101; and (c) other vehicles, which comprise the remaining vehicle nodes.

Embodiments of the present invention are related to mobile infrastructure (relay, forwarder) selection in a multi-technology vehicular environment (e.g. Cellular and ITS-G5) by finding an optimal dissimilarity relation among the nodes to provide maximum information penetration in a certain geographical area based on application constraints and requirements, and quickly changing vehicular environment. Furthermore, embodiments combine the coverage area optimization problem with application requirements utilizing the mobility parameters (e.g. distance, direction, speed and external factors like traffic). Instead of leaving all the decision on the vehicle side, this system allows the central server 100 to impact the efficiency of the message penetration in a given geographic destination dissemination region.

According to a preferred embodiment, the information dissemination process is implemented by network nodes being selected from a set of available nodes based on an optimal dissimilarity relation index. The dissimilarity relation is an index where the less similar areas a vehicle covers, the larger are the relation index values. The proposed dissimilarity relation between vehicles in a given geographic region has an influence on the selection procedure of the mobile infrastructure at the central entity 100. During the selection procedure, all the constraints (application requirements, network load, vehicle mobility, etc.) that originate from different entities can be considered. This problem can be formulated as a constrained version of the max-min problem: maximal coverage area (e.g. number of receiving nodes) with minimum set of nodes involved in the dissemination process considering application constraints, among others. The decisions made at the central entity 100 are propagated to selected vehicles that perform local action execution or adaptation if the conditions have evolved. On the other hand, these nodes can instruct other nodes.

As can be obtained from the embodiment of FIG. 1, the central entity 100, which is implemented as Geoserver 101, is located in a remote location and manages the information dissemination process. The Geoserver 101 is connected to the infrastructure units 102, 104 and has an interface to one or more service providers 107. The Geoserver 101 can aggregate the constraints form the service provider 107, network constraints and vehicular network constraints. Based on the application requirements, the Geoserver 101 analyzes all potential vehicle ITS stations 106 which can act as mobile infrastructure. It then builds a dissimilarity relation among these vehicles such that selection of each vehicle will maximize the coverage area achieved in the given geographic destination dissemination area. In FIG. 1, this destination dissemination area is schematically indicated by the dotted line.

Within the dissemination region, a multi-technology vehicle ITS stations comprises of 1) ITS-G5 communication network, either for vehicle-to-vehicle (V2V) communications and vehicle-to-infrastructure (V2I) communications, and 2) a cellular network 105 for vehicle-to-infrastructure communications and vice versa. In this scenario, vehicles 106 can be equipped with a positioning system, short-range and/or long-range communication capabilities, and communication between vehicles 106 can be in multi-hop fashion. Depending on the local market choices, there may be ITS-G5 road-side units 102 and/or cellular infrastructure (e.g. eNodeB 104) for vehicle-to-infrastructure communications. A service request for information dissemination may be received from a service provider 107 or from one of the nodes in the communication network.

Figure 2:
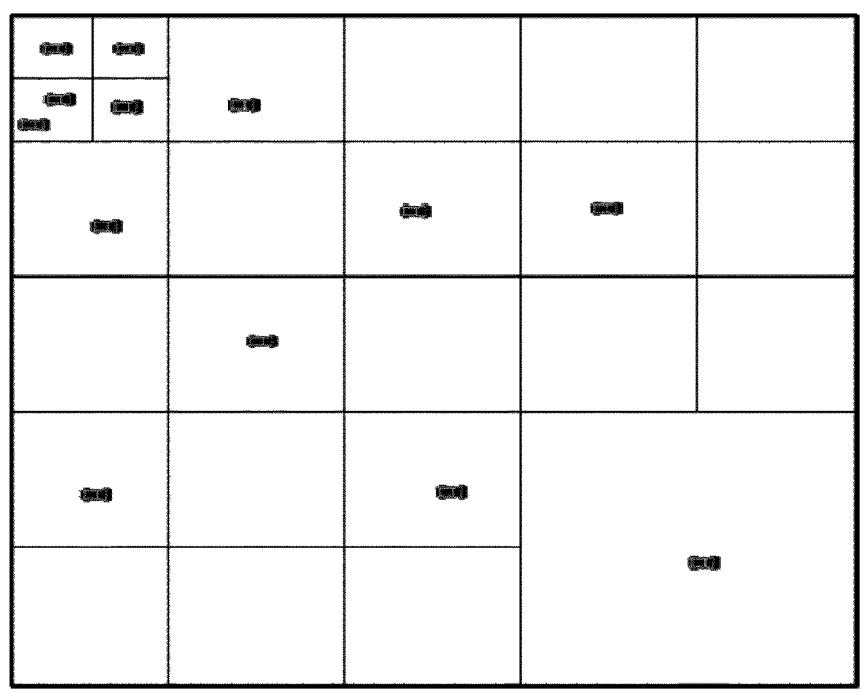
FIG. 2 is a schematic view illustrating the division of a geographic area into sub-areas in accordance with an embodiment of the present invention.

According to a preferred embodiment, first, the geographical destination dissemination area is divided into a number of sub-areas, as illustrated in FIG. 2. Maximum and minimum dimensions may be considered for these sub-areas to achieve a good balance between granularity and statistical relevance. As the number of reports received in a given sub-area clearly surpasses the statistical relevance level, this sub-area may be further subdivided into smaller areas. With respect to the scenario illustrated in FIG. 2, this means that the density of vehicles that report their status to the Geoserver 101 in the upper left part of FIG. 2 is rather high, and therefore the sub-areas can be chosen to be rather small. In the lower right part of FIG. 2 the conditions are assumed to be the other way round, i.e. low vehicle density and therefore larger sub-areas. The processing for coverage area determination is done independently at each sub-area by statistically analyzing the report information received from the vehicles.

It should be noted that the illustration of the sub-areas in form of rectangles in FIG. 2 has been chosen for the sake of a simplified illustration. As will be easy appreciated by those skilled in the art, other forms (e.g. honeycomb or circular forms) may be chosen to divide the destination dissemination area into sub-areas or zones.

Taking the destination dissemination area, which is divided into zones, a dissimilarity function is defined to obtain non-overlapping propagation areas. This function computes the dissimilarity index between vehicles: the less similar areas a vehicle covers, the larger is the dissimilarity index. This computation allows reducing the search space and converging to a solution faster. The stability of a node to act as a mobile infrastructure may also be taken into account when computing the dissimilarity index.

In the second step, information from vehicles is periodically received, stored and processed by the Geoserver 101, which allows having a bird-eye view of the nodes positions and associated static and dynamic characteristics. The Geoserver 101 may also receive additional information from other data sources (e.g. coverage information from network operators).

In an embodiment, once the primary set of vehicle ITS stations 106 are elected as relay nodes, a forwarder node or multiple forwarding nodes may be elected to assist the further propagation of the information to reach the destination area (vehicles) using preferably ad-hoc approach, which could be for instance ITS-G5 or LTE D2D. The forwarding process could be of either a single hop or multi-hop nature, i.e. a forwarder might instruct other vehicles to act as forwarding nodes to further propagate the information. The forwarding nodes may be chosen in a way to guarantee most efficient and reliable propagation of the information towards the destination area. The Key performance Indicator's (KPI's) can be derived from specific application requirements and can influence the forwarding parameters e.g. adjusting the efficiency, reliability and latency. If the forwarding nodes are located in the destination area, they can be instructed to further forward the information to reach further vehicles. The forwarding instructions may be decided by the Geoserver 101 considering the instantaneous conditions of the vehicular and cellular environments (e.g. network status/quality/coverage, vehicular position). It can also take into account forwarding decisions from the past and statistically assist the process.

In another embodiment, a method for data dissemination from the centralized entity 100 to a geographic area or a group of vehicles is considered. The determination of the most appropriate information dissemination strategy depends on a number of variables or constraints. First, the requester can impose quality of service requirements to be fulfilled by the Geoserver 101 (e.g. latency, packet loss). Second, there are static conditions that influence how the dissemination can be conducted. Good examples of static parameters are the technologies available at the vehicle and the availability of infrastructure at a given location. Thus, scenarios with no or partial deployment of one technology are considered. However, due to high node mobility in vehicular networks it should be highlighted that, for a given geographic area, the penetration ratio is variable according to dynamic aspects and consequently should be considered in the dissemination process. Third, dynamic factors, such as node mobility (e.g. speed, direction) can also be of influence. The key feature of this embodiment is to provide a minimum set of flexible infrastructure in a given geographic region which can be dynamically elected among the available vehicle ITS stations.

In this context, the main functions of the Geoserver 101 can be summarized basically as follows: receive, store and process information coming from vehicles and other data sources; based on the incoming information, estimate vehicle nodes and infrastructure nodes coverage area whenever this information is not provided by a third party (due to the dynamism of the network, this step can be calculated periodically); based on the incoming information, determine the best strategy for multi-technology information dissemination in a geographical area or to number of vehicles taking into consideration the service requirements and other static and dynamic information (this step be executed either periodically or whenever a request for information dissemination is received from a service provider or from one vehicle node).

An embodiment of a dissimilarity function that may be used to compute the dissimilarity index will be described in more detail below. As an example in this context, a set of candidate vehicles ($V_i$) and their neighbor tables (NT) will be considered. Once the information has been aggregated at the Geoserver 101, it builds a dissimilarity relation index ($D_i$) between the potential vehicle ITS stations (relays) that can act as mobile infrastructure. The basic concept for the dissimilarity relation index is that the less similar areas a vehicle covers the larger are the relation index values. This allows selecting a minimal set of vehicle ITS stations while maximizing the coverage area.

To select the first vehicle ITS station in the set, a similar procedure is followed, but instead of correlating it with other vehicles each vehicle computes its self-correlation index $Z_i$ (Zone Index), i.e. the number of sub-areas a vehicle ITS station as mobile infrastructure can cover in either a single iteration or multiple iterations (limited by hop count, for instance). The vehicles can be assumed to exchange their neighbor tables which will allow them to compute $S_i$, i.e. the number of vehicles a particular vehicle can reach via short-range communication with a predefined number of hops. This $S_i$ value can be communicated to the Geoserver 101 which elects the vehicle with highest $S_i$ as a first forwarder node, and then in subsequent steps the vehicle which has the highest dissimilarity relation index to the already elected vehicle. This procedure is subject to constraints, e.g. application requirements, network load, vehicle mobility, etc.

Figure 3:
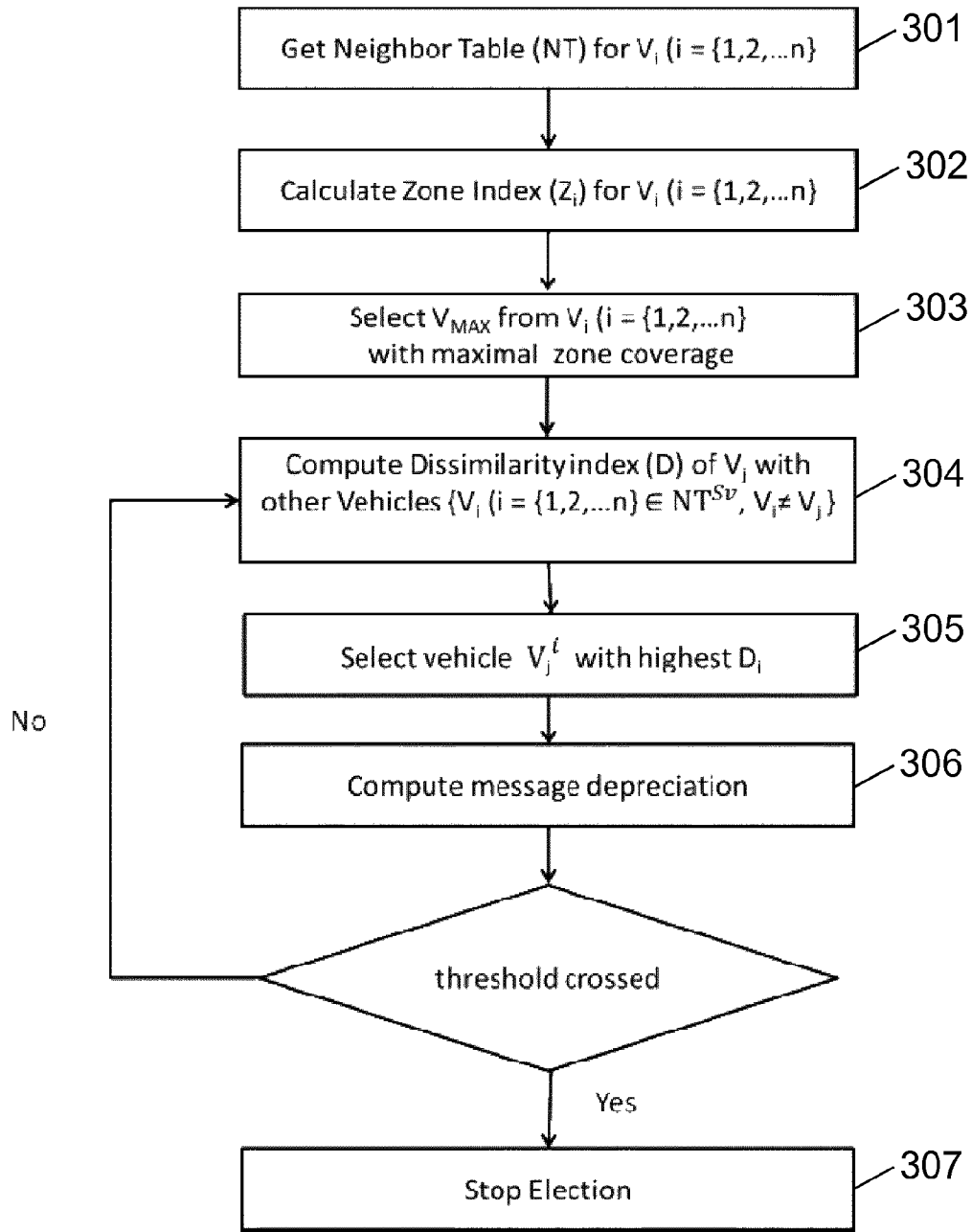
FIG. 3 is a flowchart illustrating a process of mobile infrastructure node election using a dissimilarity index in accordance with an embodiment of the present invention.
Figure 4:
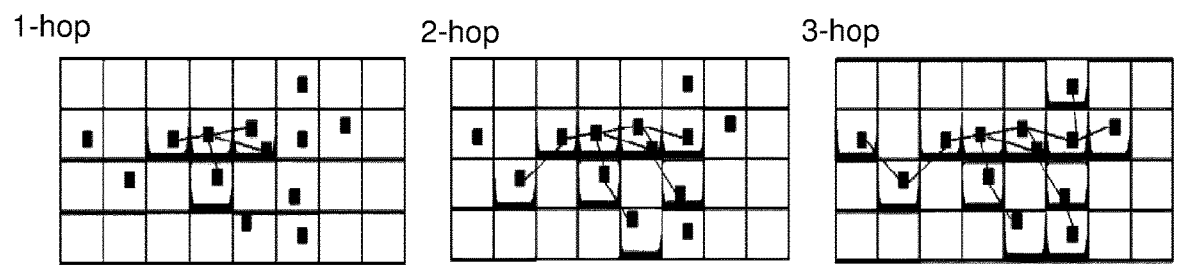
FIG. 4 is a diagram illustrating a process of single and multi-hop zone indexing in accordance with an embodiment of the present invention.

The procedure for selecting vehicles to become mobile infrastructure (relay, forwarder) nodes using the dissimilarity index is detailed further in FIG. 3. The illustrated embodiment for selecting mobile infrastructure (relay, forwarder) nodes using the dissimilarity index as described above makes use of neighbor relation data and other requirements as input data for further calculations. Once the neighbor table is aggregated at the Geoserver 101 (step 301), zone indexes are computed for each vehicle (step 302). This computation can vary from 1-hop to multiple hops and can be governed by the constraints (e.g. application requirements). This will allow selecting an initial vehicle which has a maximal coverage zone (step 303). Determining this is important because this allows computing the self-correlation index. An example for calculating the zone indexing is shown exemplarily in FIG. 4 for different number of hops between nodes. An embodiment could consider a zone indexing based on the number of areas covered for different number of hops.

Once the first vehicle is selected in step 303, the node with the highest dissimilarity index is selected as the next best candidate as mobile infrastructure (steps 304 and 305). The dissimilarity index may be determined by the number of non-overlapping zones/sub-areas, based on criteria set, either in a single or multi-hop. Upon election, the procedure can be further iterated or stopped (step 307) based on any criteria derived from the constraints.

One stopping criterion could be, for example, the information depreciation (as computed in step 306), which can be expressed in terms of the validity time of the information set by the application. This enables the selection of relays and corresponding forwarder nodes so that the maximal message penetration is achieved. A second criterion to limit the selection of relay nodes can be dependent of the resource availability and current/instantaneous network conditions. One practical realization foresees the enforcement of the relay election at the centralized entity 100/Geoserver 101, whereas the enforcement of forwarder selection takes place at relay nodes or any of the preceding forwarders. To implement the algorithm, a heuristic approach like genetic algorithms or tabu search can be used.

In the embodiment shown in FIG. 3, the stopping criterion is assumed to be "message depreciation". However, it should be noted that the criterion in step 306 is not limited to message depreciation and can be subject to any other metric of interest.

Figure 5:
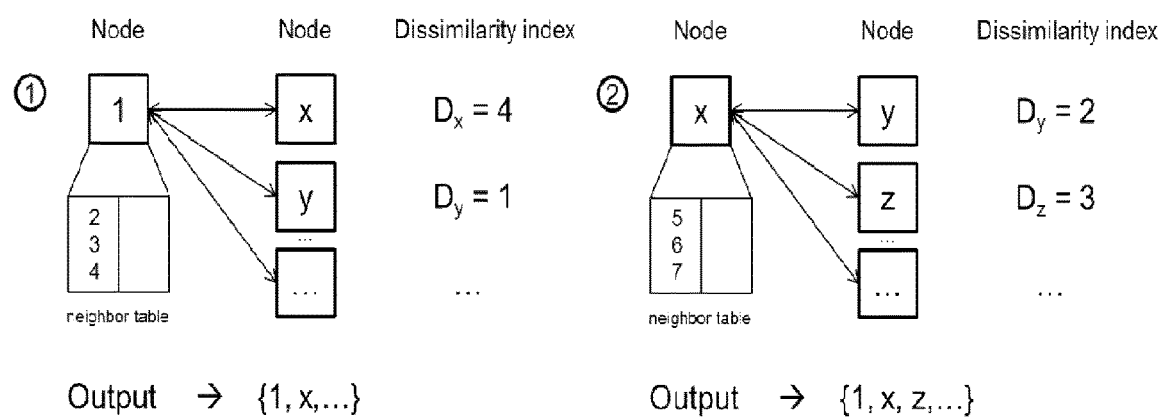
FIG. 5 is a schematic view illustrating a dissimilarity index calculation between network nodes in accordance with an embodiment of the present invention.

FIG. 5 is a schematic view illustrating an embodiment of dissimilarity index calculation between network nodes. Here it is assumed that node "1" has been elected as the first forwarder node in accordance with the procedure described above in connection with FIG. 3. Therefore, the dissimilarity indices of node "1" relative to the other nodes contained in the neighbor table of node "1" are computed. Since the dissimilarity index of node "1" relative to node "x" is assumed to take the highest value, node "x" is outputted as next forwarder node. The process of dissimilarity index calculation is then repeated for node "x", with the result that node "x" has the highest dissimilarity index relative to node "z". Therefore, node "z" is outputted as next forwarder node. This process will be repeated until a predefined stopping criterion is fulfilled, as described in detail above in connection with FIG. 3.

In a preferred embodiment, selected vehicle ITS stations (relays) periodically report information to the Geoserver 101. The information reported to the Geoserver 101 responsible for that geographic area can include vehicle position, vehicle speed, available communication technologies (e.g. ITS-G5 and/or LTE), link quality to neighbor vehicles and road-side units for ITS-G5 networks, cellular latency and packet loss, among others. Whenever possible or when instructed by the Geoserver 101, vehicles can also communicate information of other nodes in close vicinity. Ideally, only selected vehicles communicate with a remote entity to decrease the network resources usage. The process of selecting vehicle nodes for communication with the Geoserver 101 can follow the conventional cluster-based methods or any other appropriate method.

An embodiment for parameter based forwarding can be realized based on the instantaneous/current situation analyzed either at the central location or at the vehicle. A forwarding node might not immediately forward the information to other nodes. It might be decided by the centralized entity 100/Geoserver 101 or the forwarding/relay node itself that is more advantageous to buffer the information locally and wait for a more appropriate future time instant (store and forward). It can also choose to forward the information not only once, but continuously over time as it is moving. The concrete implementation/protocols should take care of not causing any issues degrading the network status/performance, e.g. broadcast storms.

A forwarding or relay node might propagate individual forwarding instructions to different vehicles over time and space. For instance, a vehicle driving along a highway might send individual forwarding instruction to other vehicles in their communication range. These forwarding instructions might be communicated by the centralized entity 100 or taken by the relay/forwarding node.

Figure 6:
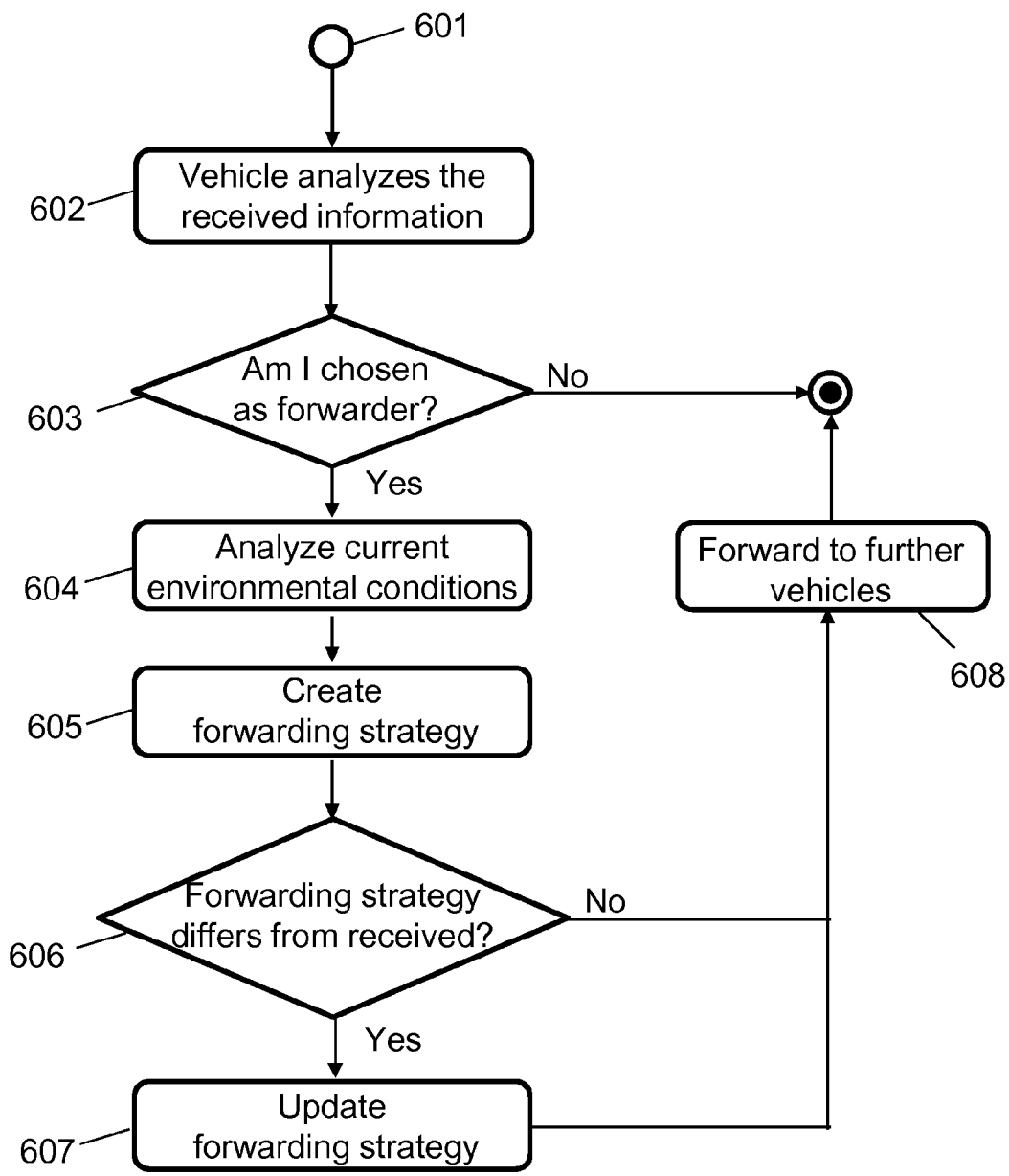
FIG. 6 is a flowchart illustrating a process of a forwarding strategy selection in accordance with an embodiment of the present invention.

FIG. 6 is a flowchart that exemplarily illustrates a procedure for executing or adapting a forwarding strategy in a VANET. According to the illustrated embodiment, in step 601, a vehicle is assumed to receive information from another network node, i.e. from another vehicle of the VANET, through any short-range communication technology, like ITS-G5. First, as illustrated in step 602, the vehicle analyzes the received information. In particular, illustrated in step 603, the vehicle checks whether it is chosen as a mobile infrastructure node to act as a forwarder node. If not, the procedure terminates. If so, however, the vehicle analyzes the current environmental conditions, e.g. with respect to its current neighbor nodes, available bandwidth, congestion, etc. (step 604). Based thereupon, in step 605, the vehicle creates its own forwarding strategy that is adapted to the current environmental conditions as analyzed in step 604. In step 606, the vehicle checks whether its created forwarding strategy differs from the forwarding strategy received in step 601. If there is a difference, in step 607, the vehicle updates the forwarding strategy, i.e. it exchanges the forwarding strategy received in step 601 by the new strategy created in step 605. By applying this new adapted forwarding strategy, the vehicle forwards the information to further vehicles (step 608). If, on the other hand, the check in step 606 yields that the forwarding strategies are identical, the vehicle can directly turn to step 608.

In conclusion, embodiments of the present invention go a significant step beyond the current state of the art by proposing a method that utilizes the vehicle mobility to efficiently and adaptively disseminate information within a geographical area in a multi-technology scenario. Furthermore, embodiments of the invention differ from previous approaches mainly by using ephemeral vehicle groupings, centralized decision making, support for multi-hop communication and distributed decision adaptation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for executing or adapting a forwarding strategy in a vehicular ad-hoc network (VANET), the method comprising:
   performing, by a first vehicle being a node in the VANET, the following actions:
   analyzing current environmental conditions;
   creating a forwarding strategy for forwarding information to other vehicles being nodes in the VANET based on the current environmental conditions, wherein one or more of the other vehicles are selected to be either a relay node or a forwarding node in the forwarding strategy based on dissimilarity relations with respect to coverage areas; and
   forwarding the information to the other vehicles in the VANET according to the created forwarding strategy.

2. The method according to claim 1, further comprising determining, by the first vehicle, that the created forwarding strategy is different than a previously received forwarding strategy, and exchanging the previously received forwarding strategy for the created forwarding strategy.

3. The method according to claim 1, further comprising reporting, by the first vehicle, information to a central entity of the VANET, wherein the central entity determines coverage areas of nodes of the VANET.

4. The method according to claim 3, wherein the information reported to the central entity includes one or more of a speed of the first vehicle, a position of the first vehicle, connectivity information of the first vehicle, link quality to one or more neighbor vehicles or road-side network nodes, cellular latency, and packet loss.

5. The method according to claim 3, wherein the information reported to the central entity is transmitted at regular intervals.

6. The method according to claim 1, wherein the forwarding information to other vehicles in the VANET according to the created forwarding strategy comprises forwarding information to other vehicles via short-range communications.

7. The method according to claim 6, wherein the short-range communications are transmitted via a wireless local area network (WLAN) channel.

8. The method according to claim 6, wherein the short-range communications are transmitted via ITS-G5 vehicle-to-vehicle technology or via LTE device-to-device technology.

9. The method according to claim 1, further comprising forwarding information to VANET infrastructure via long-range communications.

10. The method according to claim 1, the method further comprising determining that the first vehicle has been selected as a forwarder node.

11. The method according to claim 10, wherein the determining that the first vehicle has been selected as a forwarder node comprises determining that a previously received forwarding strategy has selected the first vehicle as a forwarder node.

12. The method according to claim 1, wherein the current environmental conditions include one or more of a speed of the first vehicle, a position of the first vehicle, connectivity information of the first vehicle, link quality to one or more neighbor vehicles or road-side network nodes, cellular latency, and packet loss.

13. The method according to claim 1, further comprising determining, for at least two neighboring ones of the other vehicles, a number of the other vehicles which are reachable by short-range communications with a predefined number of hops, and selecting one of the at least two neighboring vehicles which is determined to be able to reach more of the other vehicles as a first forwarding node in the forwarding strategy.

14. The method according to claim 13, further comprising computing, for the one of the at least two neighboring vehicles selected as the first forwarding node, a dissimilarity index with respect to other neighboring vehicles of the other vehicles, and selecting one of the other neighboring vehicles to be a second forwarding node based thereon, wherein the one of the other neighboring vehicles having the highest dissimilarity index is selected to be the second forwarding node.

15. The method according to claim 14, wherein the dissimilarity index is computed in each case based on a number of non-overlapping geographic coverage zones.

16. The method according to claim 1, further comprising computing a dissimilarity index with respect to at least two other neighboring ones of the other vehicles, wherein one of the at least two other neighboring ones of the other vehicles having the highest dissimilarity index is selected to be a forwarding node.

17. The method according to claim 1, wherein the forwarding strategy includes at least one of the other vehicles selected to be a relay node and at least one of the other vehicle selected to be a forwarding node, and wherein, according to the forwarding strategy, the relay node propagates the information through the use of cellular communication and/or short-range communication and the forwarding node propagates the information locally through the use of vehicle-to-vehicle short-range communication.

18. A vehicle in a vehicular ad-hoc network (VANET), the vehicle being configured to:
analyze current environmental conditions;
create a forwarding strategy for forwarding information to other vehicles being nodes in the VANET based on the current environmental conditions, wherein one or more of the other vehicles are selected to be either a relay node or a forwarding node in the forwarding strategy based on dissimilarity relations with respect to coverage areas; and
forward the information to the other vehicles in the VANET according to the created forwarding strategy.

19. The vehicle according to claim 18, wherein the current environmental conditions include one or more of a speed of the first vehicle, a position of the first vehicle, connectivity information of the first vehicle, link quality to one or more neighbor vehicles or road-side network nodes, cellular latency, and packet loss.

20. The vehicle according to claim 18, wherein the vehicle is further configured to determine that the created forwarding strategy is different than a previously received forwarding strategy, and to exchange the previously received forwarding strategy for the created forwarding strategy.

* * * * *